(12) United States Patent
Sowle et al.

(10) Patent No.: US 11,966,801 B2
(45) Date of Patent: Apr. 23, 2024

(54) ROTATION-INSENSITIVE RFID DEVICES AND METHODS OF FORMING THE SAME

(71) Applicant: Avery Dennison Retail Information Services LLC, Mentor, OH (US)

(72) Inventors: Elizabeth Sowle, Bellbrook, OH (US); Ian J. Forster, Chelmsford (GB); Edward J. McGinniss, Clinton, SC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 217 days.

(21) Appl. No.: 17/636,953

(22) PCT Filed: Aug. 28, 2020

(86) PCT No.: PCT/US2020/048520
§ 371 (c)(1),
(2) Date: Feb. 21, 2022

(87) PCT Pub. No.: WO2021/041892
PCT Pub. Date: Mar. 4, 2021

(65) Prior Publication Data
US 2022/0358340 A1 Nov. 10, 2022

Related U.S. Application Data

(60) Provisional application No. 62/892,879, filed on Aug. 28, 2019.

(51) Int. Cl.
G06K 19/077 (2006.01)
H01Q 1/38 (2006.01)

(52) U.S. Cl.
CPC . *G06K 19/07756* (2013.01); *G06K 19/07788* (2013.01)

(58) Field of Classification Search
CPC .. Y10T 156/1082; H04B 5/00; H04B 5/0062; H04B 5/0068; G09F 3/10; G09F 3/16;
(Continued)

(56) References Cited

U.S. PATENT DOCUMENTS 5,420,757 A 5/1995 Eberhardt et al.
6,107,920 A 8/2000 Eberhardt et al.
(Continued)

FOREIGN PATENT DOCUMENTS

DE 102008016274 10/2009
WO 2011/081972 7/2011

OTHER PUBLICATIONS

UHF Gen2 STRAP, Texas Instruments, RI-UHF-STRAP-08, 11-09-22-706, Oct. 2006, 9 pages. https://www.alldatasheet.com/datasheet-pdf/pdf/177692/TI/RI-UHF-STRAP-08.html.
(Continued)

*Primary Examiner* — Dionne Pendleton

(57) ABSTRACT

An RFID device includes a substrate and a lead frame secured to the substrate. The lead frame includes a pair of connection pads formed of a conductive material. An RFID chip and an antenna are electrically coupled to the lead frame. The width of the lead frame is substantially equal to the height of the lead frame. The connection pads of the lead frame may be oriented, among other options, along a direction parallel to a height of the substrate or along a direction parallel to a width of the substrate.

19 Claims, 8 Drawing Sheets

(58) Field of Classification Search
CPC .. G01R 31/01; G01R 31/2822; G01R 31/312;
G06K 19/07749; G06K 19/0775; G06K
19/0717; G06K 19/073; G06K 19/07345;
G06K 19/07718; G06K 19/07745; G06K
19/07779; G06K 19/07783; G06K
19/07798; G06K 7/0008; G06K 7/0095;
G06K 7/10465; G06K 19/07752; G06K
19/07756; G06K 19/07788; H01L
2924/00; H01L 21/56; H01L 2223/6677;
H01L 2224/16; H01L 2224/29101; H01L
2224/2919; H01L 2224/7565; H01L
2224/838; H01L 23/49855; H01L 24/29;
H01L 24/83; H01L 2924/0002; H01L
2924/0102; H01L 2924/01047; H01L
2924/01082; H01L 2924/014; H01L
2924/0665; H01L 2924/07811; H01L
2924/14; H01L 2924/3011
See application file for complete search history.

(56) References Cited

U.S. PATENT DOCUMENTS

| 6,206,292 | B1 | 3/2001 | Robertz |
| 6,262,692 | B1 | 7/2001 | Babb |
| 6,951,596 | B2 | 10/2005 | Green et al. |
| 8,511,569 | B1 | 8/2013 | Koepp et al. |
| 8,665,172 | B2 | 3/2014 | Rietzler et al. |
| 9,633,302 | B1 | 4/2017 | Heinrich |
| 9,780,062 | B2 | 10/2017 | Ayala et al. |
| 10,679,478 | B2 | 6/2020 | Forster |
| 2008/0001769 | A1 | 1/2008 | Mayer-Zintel et al. |
| 2008/0018477 | A1 | 1/2008 | Forster et al. |
| 2008/0129455 | A1 | 6/2008 | Oberle |
| 2010/0066538 | A1* | 3/2010 | Ogata ............ G09F 3/16 156/268 |
| 2014/0285382 | A1* | 9/2014 | Dobric ........... H01Q 9/0414 343/700 MS |
| 2021/0182650 | A1* | 6/2021 | Lotya ............. H04B 5/22 |

OTHER PUBLICATIONS

International Search Report and Written Opinion dated Oct. 29, 2020 issued in corresponding IA No. PCT/US2020/048520 filed Aug. 28, 2020.

International Preliminary Report on Patentability dated Mar. 1, 2022 issued in corresponding IA No. PCT/US2020/048520 filed Aug. 28, 2020.

* cited by examiner

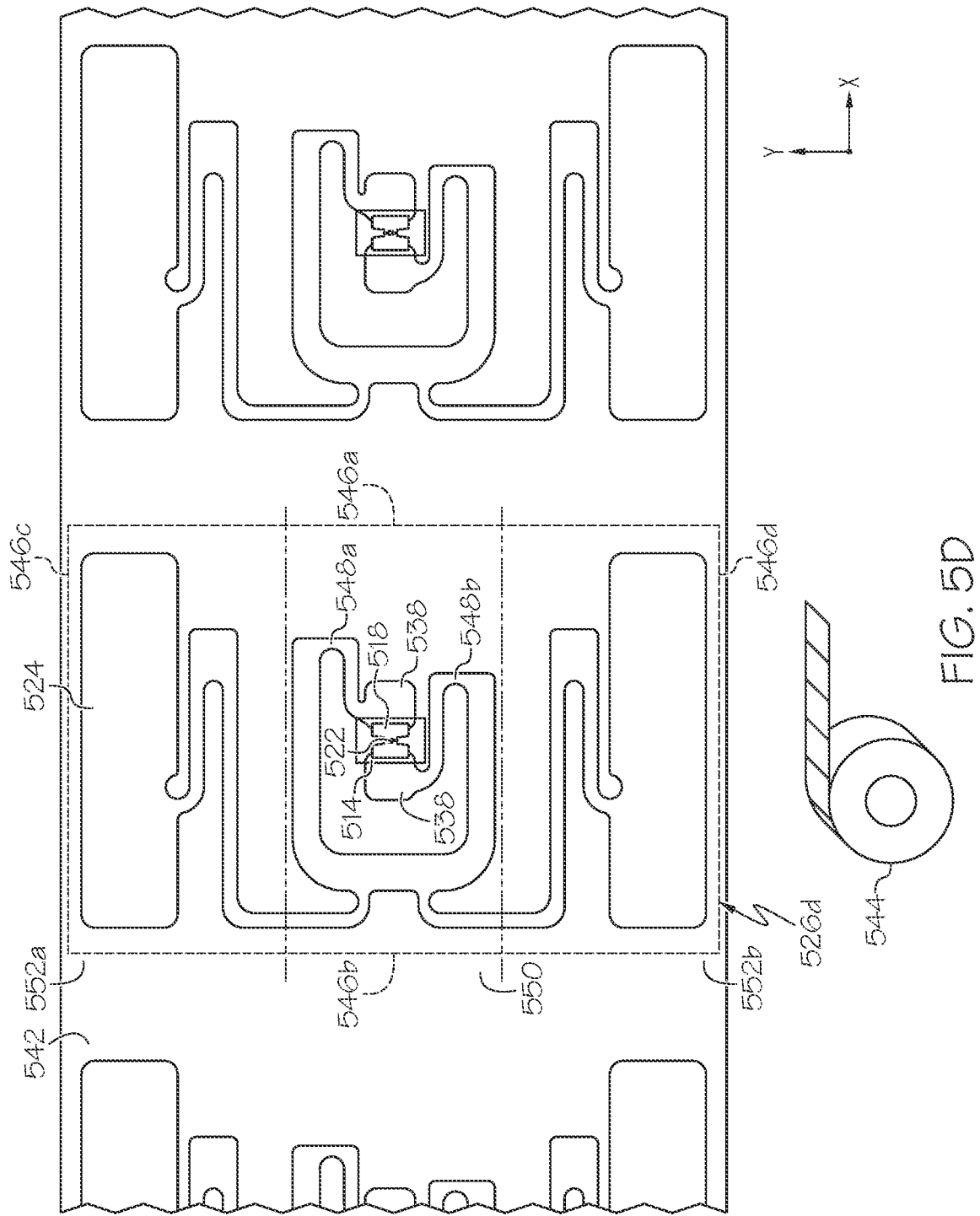

ROTATION-INSENSITIVE RFID DEVICES AND METHODS OF FORMING THE SAME

CROSS-REFERENCE TO RELATED APPLICATION

The present application is a 371 of International Application No. PCT/US2020/048520, which was published in English on Mar. 4, 2021, and claims the benefit of U.S. Provisional Patent Application No. 62/892,879 filed Aug. 28, 2019, both of which are incorporated herein by reference in their entireties.

BACKGROUND

The present subject matter relates to radio frequency identification ("RFID") devices. More particularly, the present subject matter relates to rotation-insensitive RFID devices and methods for making such RFID devices.

RFID tags and labels (collectively referred to herein as "devices") are widely used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels. Some examples of RFID tags and labels appear in U.S. Pat. Nos. 6,107,920; 6,206,292; 6,262,692, and 6,951,596, and PCT Application No. WO 2011/081972, all of which are hereby incorporated herein by reference in their entireties.

An RFID device may include a strap electrically coupled to an antenna. RFID straps include a conductive trace (which may be referred to as a lead frame) electrically coupled to a chip, such as an integrated circuit chip. The lead frame is used to facilitate the electrical connection between the antenna and the chip. FIG. 1A illustrates a conventional RFID strap 110. The RFID strap 110 includes a lead frame 112, which includes a conductive material (e.g., aluminum) applied to a strap substrate or carrier 114. The strap substrate 114 includes a pair of opposing long edges 116a and 116b and a pair of opposing short edges 116c and 116d. The long edges 116a and 116b extend along a direction that is referred to herein as the width, W, of the strap substrate 114, while the short edges 116c and 116d extend along a direction that is referred to herein as the height, H, of the strap substrate 114. The strap substrate 114 may be formed of any of a variety of (preferably non-conductive) materials, such as a paper, fabric, or polymeric (e.g., polyethylene terephthalate) materials.

The conductive material of the lead frame 112 defines a pair of connection pads 118. As shown in FIG. 1A, each connection pad 118 is elongated in a direction extending away from the other connection pad 118, thus giving the lead frame 112 a width, w, that is significantly greater than a height h of the lead frame 112. For example, the width, w, of the lead frame 112 may be on the order of at least twice as large as the height, h, of the lead frame 112. The end of each connection pad 118 facing the other connection pad 118 defines a narrowed landing area 120 having a lesser height than the remainder of the connection pad 118. An RFID chip 122 is electrically coupled to the connection pads 118 of the lead frame 112 at the landing areas 120. Due to the dimensions of the lead frame 112, it is restricted to one orientation on the supporting strap substrate 114. In particular, the lead frame 112 must be oriented with its greater dimension, w, parallel to the greater dimension, W, of the strap substrate 114. The width, w, of the lead frame 112 is greater than the height, h, of the strap substrate 114, such that the strap substrate 114 cannot accommodate the lead frame 112 in a 90-degree rotated orientation.

During manufacturing, a plurality of straps 110 are cut by a converting machine into individual straps 110, with the lead frame 112 of each strap 110 being electrically coupled to an associated antenna 124 to define an RFID device 126 (FIG. 1B). The antenna 124 may be attached to the strap 110, or it may be attached to a separate antenna substrate (see FIG. 4). The converting machine is configured to accommodate a particularly dimensioned and oriented strap substrate 114, which (in combination with the restricted orientation of the lead frame 12 on the strap substrate 114) may limit the configuration of the resulting RFID device 126 or may require additional development work.

For example, some manufacturing systems may typically involve use of a strap substrate 114 that is aligned with a cross-web direction regardless of inlay orientation during manufacturing. Thus, when an inlay design is being modified between wide-edge leading or narrow-edge leading for manufacturing, redesigning efforts may need to be made to accommodate a standard strap orientation. Such redesigning may require use of limited resources such as designer time, simulation time, computing resources, physical prototyping resources, and physical testing equipment and materials. These requirements may also apply to multiple designs that are each intended to be switched between a wide-edge leading and a narrow-edge leading format or vice versa.

As a result, if a lead frame 112 is oriented to operate with a wide edge-leading inlay antenna (e.g., as may apply to FIG. 1B) and a user requires an RFID device with a narrow edge-leading inlay antenna, there may be significant difficulty in associating the antenna to the strap substrate 114 with its mismatched lead frame 112, which can also diminish performance of the resulting RFID device.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect of the disclosure, an RFID device includes a substrate and a lead frame secured to the substrate. The lead frame includes a pair of connection pads formed of a conductive material. An RFID chip is electrically coupled to the lead frame. Additionally, an antenna is electrically coupled to the lead frame. A width of the lead frame is substantially equal to a height of the lead frame.

The substrate may include two long edges extending in a direction parallel to a width of the substrate and two short edges extending in a direction parallel to a height of the substrate. The connection pads may be oriented along a direction parallel to the height of the substrate.

The lead frame may be positioned equidistant from the two short edges of the substrate, and the distance between the lead frame and each short edge of the substrate may be substantially equal to the width of the lead frame. The height of the lead frame may be within 5% or 10% of the width of the lead frame.

The substrate may include two long edges extending in a direction parallel to a width of the substrate and two short edges extending in a direction parallel to a height of the substrate. The connection pads may be oriented along a direction parallel to the width of the substrate.

The lead frame may be positioned equidistant from the two short edges of the substrate, and the distance between the lead frame and each short edge of the substrate may be substantially equal to the width of the lead frame. The height of the lead frame may be within 5% or 10% of the width of the lead frame.

In another aspect of the disclosure, an RFID strap includes a substrate and a lead frame secured to the substrate. The lead frame includes a pair of connection pads formed of a conductive material and configured to receive an antenna. The RFID strap also includes an RFID chip electrically coupled to the lead frame. A width of the lead frame is substantially equal to a height of the lead frame.

In another aspect, a method of manufacturing an RFID device includes providing a substrate and securing a lead frame to the substrate. The lead frame includes a pair of connection pads formed of a conductive material. An RFID chip and an antenna are electrically coupled to the lead frame, which has a width that is substantially equal to its height.

BRIEF DESCRIPTION OF THE DRAWINGS

FIGS. 5A, 5B, 5C, and 5D are top plan views of sections of rolls of RFID devices, in accordance with some embodiments.

DESCRIPTION OF THE ILLUSTRATED EMBODIMENTS

As required, detailed embodiments of the present subject matter are disclosed herein; however, it is to be understood that the disclosed embodiments are merely exemplary of the present subject matter, which may be embodied in various forms. Therefore, specific details disclosed herein are not to be interpreted as limiting, but merely as a basis for the claims and as a representative basis for teaching one skilled in the art to variously employ the present subject matter in virtually any appropriate manner.

This disclosure includes systems and methods associated with rotation-insensitive RFID devices and methods for making and using RFID devices. For example, some systems and methods disclosed here may be used for adaptively manufacturing various RFID devices without significant modification of some antenna components. For some embodiments, lead frame or strap connection pads may be designed to operate with antenna designs that may have been incompatible or less effective with conventional strap and lead frame systems. For some exemplary systems, this includes designing the lead frame to permit rotation relative to the strap substrate, which may permit the use of rotated versions of the strap and lead frame to be rapidly combined with a variety of antenna systems.

Figure 1A:
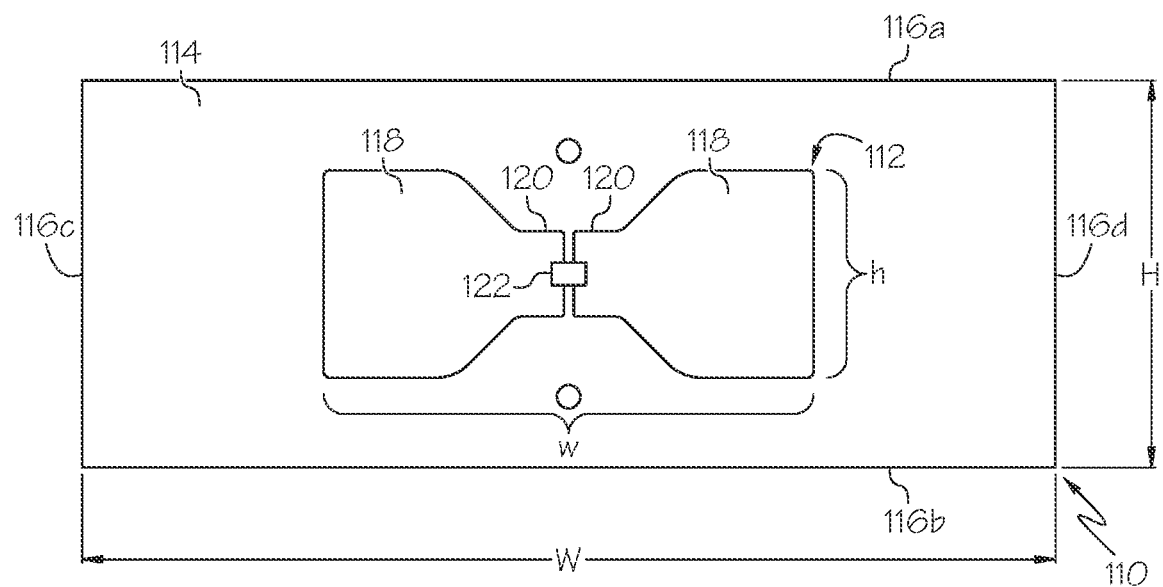
FIG. 1A is a top plan view of an RFID strap according to conventional design.
Figure 1B:
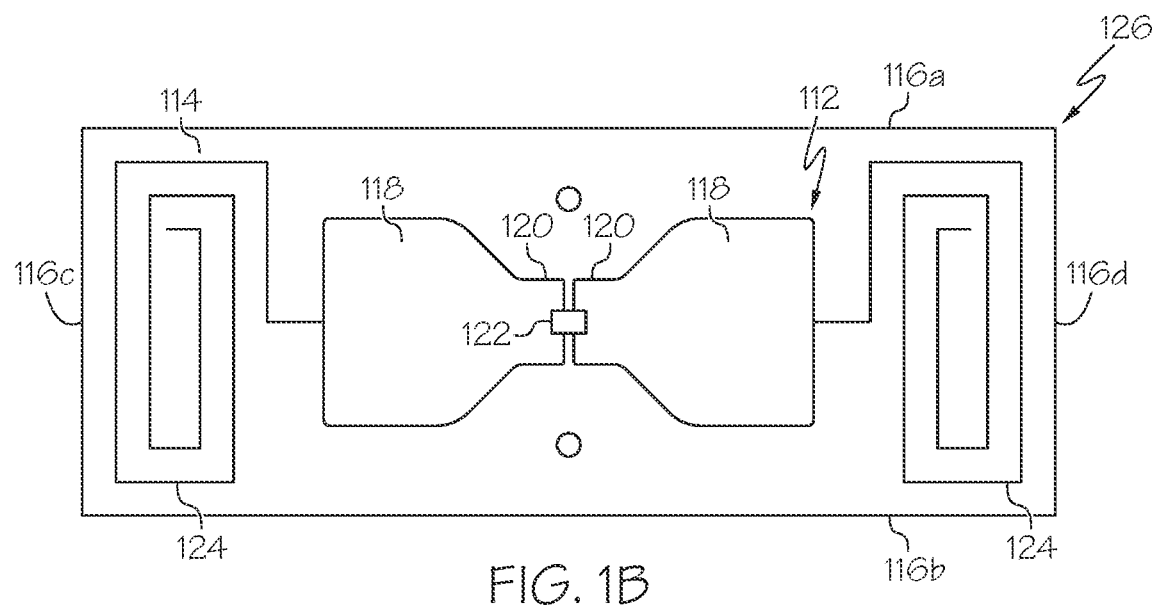
FIG. 1B is a top plan view of an RFID device incorporating the strap of FIG. 1A.
Figure 2A:
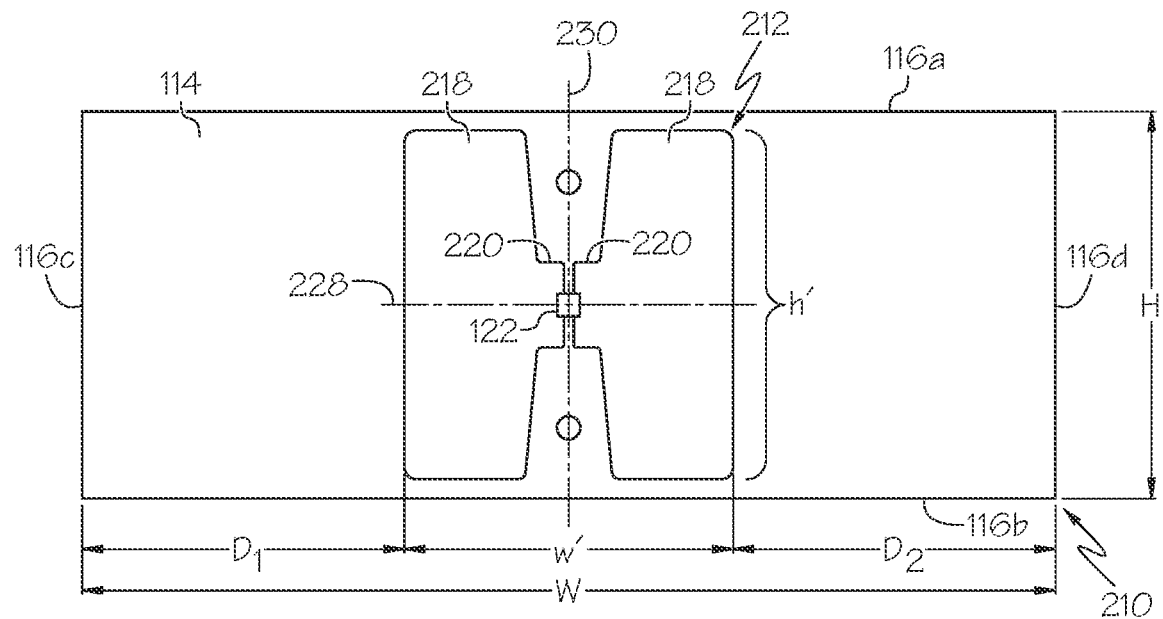
FIG. 2A is a top plan view of an RFID strap according to an aspect of the present disclosure, with a lead frame oriented along a direction parallel to a width of the associated substrate.

FIG. 2A illustrates an RFID strap 210 in accordance with an aspect of the present disclosure. The RFID strap 210 is shown with the same strap substrate 114 as the conventional strap 110 of FIG. 1A to illustrate the differences between the lead frame 212 of FIG. 2A and the conventional lead frame 112, as will be described in greater detail herein. However, it should be understood that the substrate of an RFID strap according to the present disclosure may be variously configured without departing from the scope of the present disclosure.

The RFID strap 210 includes a lead frame 212 secured to the strap substrate 114. The lead frame 212 includes a pair of strap connection pads 218 formed of a conductive material (e.g., aluminum). Similar to the connection pads 118 of FIG. 1A, in some embodiments, each strap connection pad 218 of FIG. 2A includes a narrowed landing area 220 having a lesser height than the remainder of the strap connection pad 218 and configured for electrical coupling to an RFID chip 122. The RFID chip 122 may be 400 microns square (e.g., in an XY plane), or have other dimensions such as being less than any of 1 millimeter, 800 microns, or 500 microns square. Each RFID chip 122 may include two or more chip connection pads 434 (see FIG. 4) that can be used to electrically couple the RFID chip 122 to strap connection pads 218. The chip connection pads 434 may each have long edges that are equal to or smaller than the length of the RFID chip 122 and short edges that are equal to or smaller than half the length of the RFID chip 122 as measured along the X-axis or Y-axis directions.

Figure 2B:
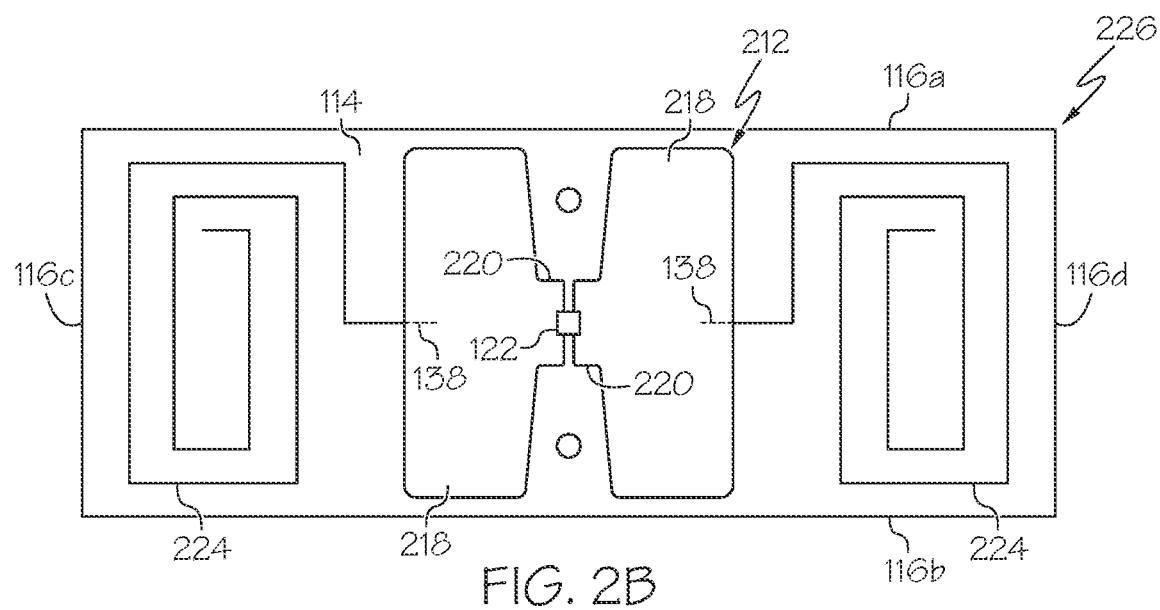
FIG. 2B is a top plan view of an RFID device incorporating the strap of FIG. 2A.

The strap connection pads 218 are configured to also be electrically coupled to antenna connection pads 138 of an antenna 224 when the RFID strap 210 is incorporated into an RFID device 226, as shown in FIG. 2B. In the orientation of FIG. 2A, the strap connection pads 218 are oriented along a direction parallel to the width W of the strap substrate 114, such as by aligning the first axis 228 to be parallel to the long edges 116a and 116b of the strap substrate 114. This orientation of the strap connection pads 218 renders the strap RFID 210 suitable for operation with antenna 224 and the antenna connection pads 138, as in FIG. 2B. Antenna 224 may be configured as a wide edge-leading inlay or a narrow edge-leading inlay, depending on a manufacturing machine configuration for how antennas, antenna webs, straps, or strap webs are oriented relative to each other (see FIGS. 5A and 5B). Antenna 224 and the antenna connection pads 138 may be mounted on the strap substrate 114 or on a separate antenna substrate 442 or 542 (see FIGS. 4, 5A, and 5B).

Orientation of the lead frame 212 may be defined by a first axis 228 extending from one of the strap connection pads 218 to the other strap connection pad 218. Alternatively, orientation of the lead frame 212 may be defined by a second axis 230 separating the strap connection pads 218. In various embodiments, one or both of the first axis 228 and second axis 230 define axes of symmetry for the lead frame 212.

Due to the lead frame 212 being subject to two or more possible orientations on a strap substrate 114, it should be clarified what is meant by default by the "width" and "height" of the lead frame 212. As used herein to describe the dimensions of a lead frame 212 according to the present disclosure, the term "width" refers to the size of the lead frame in a direction parallel to the width or longer dimension of the surface of the associated strap substrate to which the lead frame is secured. Hence, in the orientation of FIG. 2A, the width, w', of the lead frame 212 refers to the size of the lead frame 212 in the direction in which the strap connection pads 218 are oriented, while the width, w", of the lead frame 212 in FIG. 3A refers to the size of the lead frame 212 in a direction perpendicular to the direction in which the strap connection pads 218 are oriented. Similarly, the term "height" refers to the size of the lead frame in a direction parallel to the height or shorter dimension of the surface of the associated strap substrate to which the lead frame is secured. Hence, in the orientation of FIG. 2A, the height, w', of the lead frame 212 refers to the size of the lead frame 212 in a direction perpendicular to the direction in which the strap connection pads 218 are oriented, while the height, w", of the lead frame 212 in FIG. 3A refers to the size of the lead frame 212 in the direction in which the strap connection pads 218 are oriented.

In some alternate embodiments, a first axis height of the lead frame 212 may be determined by the longest measurement of the lead frame 212 as measured along the first axis 228. In addition, a second axis width may be determined by the longest measurement of the lead frame 212 as measured along the second axis 230.

The lead frame 212 has a width, w', extending in a direction parallel to the width, W, of the strap substrate 114 and a height, h', extending in a direction parallel to the height, H, of the strap substrate 114. In contrast to the conventional lead frame 112, the width, w', of the lead frame 212 is equal to or at least substantially equal to the height, h', of the lead frame 212, rather than being significantly larger than the height, h'. Consequently, the lead frame 212 has a substantially square footprint, rather than a substantially rectangular footprint. More particularly, the height, h', of the lead frame 212 may be the same as the width, w', of the lead frame 212. In another embodiment, the height, h', of the lead frame 212 is within 5% of the width, w', of the lead frame 212. In yet another embodiment, the height, h', of the lead frame 212 is within 10% of the width, w', of the lead frame 212. In other embodiments, the height, h', of the lead frame 212 is within 1%, 2%, 3%, 4%, 6%, 7%, 9%, 20%, or 30% of the width, w', of the lead frame 212. This is in contrast to a conventional lead frame 112, which has a width, w, that is on the order of twice as large as the height, h, of the lead frame 112.

Regardless of whether the width, w', and height, h', of the lead frame 212 are the same size or differently sized, they are both selected to be smaller than the height, H, of the strap substrate 114. In an exemplary embodiment, the strap substrate 114 has a height, H, of 4.75 mm and a width of 12 mm, with the lead frame 212 having a width, w', of 4 mm and a height, h', of 4.25 mm (i.e., a height, h', that is within approximately 6% of the width, w', of the lead frame 212). Thus, if the lead frame 212 is centrally positioned on the strap substrate 114 (as shown in FIG. 2A), the top and bottom edges of the lead frame 212 (in the orientation of FIG. 2A) are each spaced approximately 0.25 mm from the adjacent long edge 116a, 116b of the strap substrate 114, while the left and right edges of the lead frame 212 (in the orientation of FIG. 2A) are each spaced approximately 4 mm from the adjacent short edge 116c, 116d of the strap substrate 114. In such an embodiment, with the lead frame 212 positioned equidistant from the short edges 116c and 116d of the strap substrate 114, each of the distances D1 and D2 between the lead frame 212 and each short edge 116c, 116d (i.e., the space available for placement of the antenna 224, as in FIG. 2B) is equal to or at least substantially equal to the width w' of the lead frame 212. It will be seen that the RFID strap 210 of FIG. 2A provides more space for placement of an antenna 224 on the strap substrate 114 than the strap 110 of FIG. 1A, which may allow for more flexibility in the configuration of the antenna 224 and, hence, improved performance of the resulting RFID device 226.

In various embodiments, the width w' of the lead frame 212 is smaller than and within 1%, 2%, 3%, 4%, 5%, 6%, 7%, 8%, 9%, 10%, 20%, or 30% of the strap substrate 114 height, H. In various embodiments, the distances D1 and D2 may be different from each other.

Figure 3A:
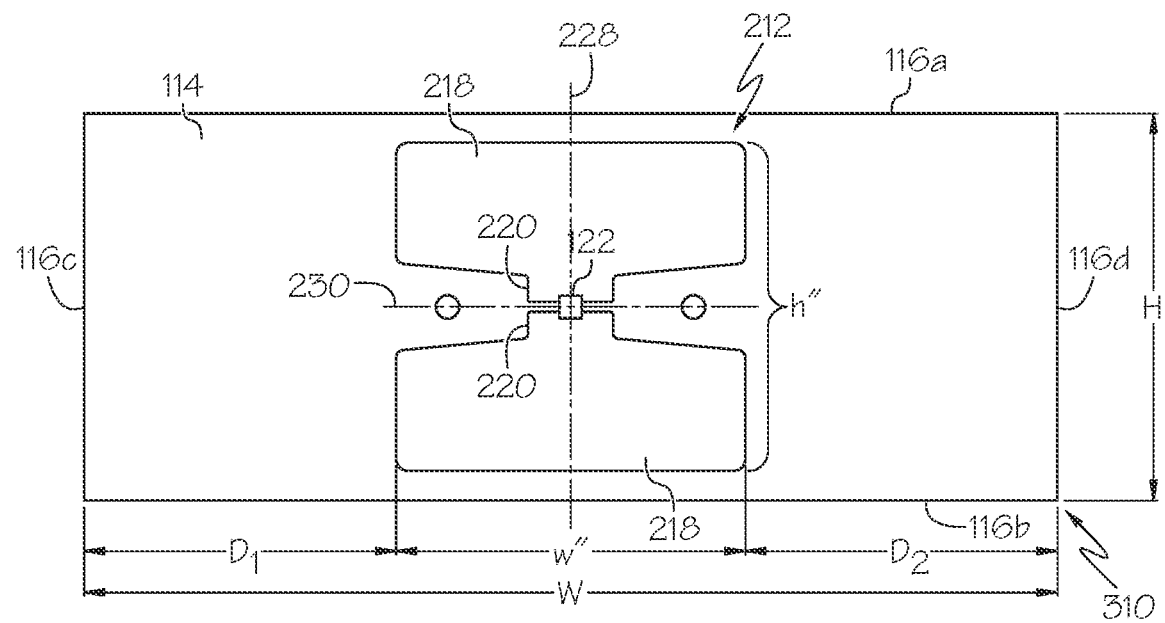
FIG. 3A is a top plan view of an RFID strap according to another aspect of the present disclosure, with a lead frame oriented along a direction parallel to a height of the strap.
Figure 3B:
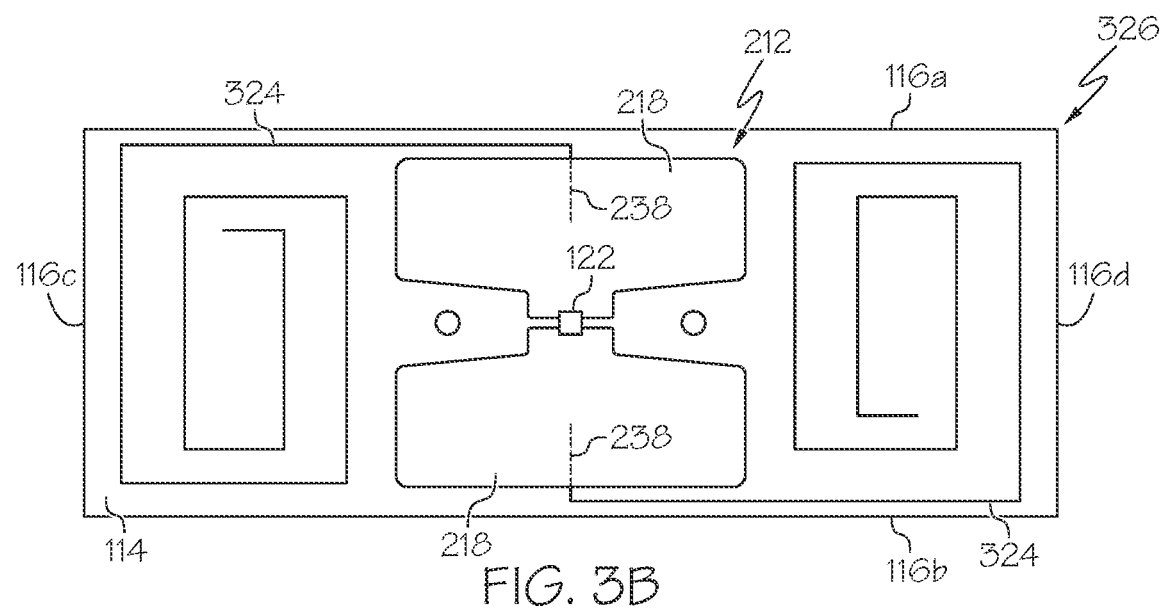
FIG. 3B is a top plan view of an RFID device incorporating the strap of FIG. 3A.

FIG. 3A shows an RFID strap 310 with the same lead frame 212 as the RFID strap 210 of FIG. 2A. However, rather than the strap connection pads 218 being oriented in a direction parallel to the width, W, of the strap substrate 114 (as in FIG. 2A), the lead frame 212 is instead rotated 90 degrees, thereby orienting the strap connection pads 218 in a direction parallel to the height H of the strap substrate 114. For example, the first axis 228 may be aligned to be parallel with the short edges 116c and 116d of the strap substrate 114.

Because the maximum height and maximum width of the lead frame 212 are each less than the height, H, of the strap substrate 114, the lead frame 212 is capable of association with the strap substrate 114 in at least the two orientations of FIGS. 2A and 3A, whereas a conventional lead frame 112 may be much more limited in compatible options for being secured to a strap substrate 114. In some embodiments, due to the orientation of the lead frame 212 in FIG. 3A, the RFID strap 310 is rendered suitable for operation with and electrical coupling with antenna 324 and antenna connection pads 238, as in FIG. 2B. Antenna 324 may be configured as a wide edge-leading inlay or a narrow edge-leading inlay, depending on a manufacturing machine configuration for how antennas, antenna webs, straps, or strap webs are oriented relative to each other (see FIGS. 5A and 5B). Antenna 324 and the antenna connection pads 238 may be mounted on the strap substrate 114 or on a separate antenna substrate 442 or 542.

It will be seen that the rotatable footprint of the lead frame 212 is a significant improvement over the conventional lead frame 112, which may only be oriented along the width, W, of the strap substrate 114, due to the larger width, w, of the lead frame 112. As such, the conventional lead frame 112 made it difficult to install for some inlay antennas (e.g., for some narrow edge-leading antennas), because the antenna would have to be designed around an incompatibly oriented lead frame 112. In contrast, by employing a lead frame 212 according to the present disclosure, a converting machine may be configured to apply the same lead frame 212 to a strap substrate 114 in either an orientation that is suitable for association with a wide edge-leading inlay antenna or an orientation that is suitable for association with a narrow edge-leading inlay antenna without having to substantially alter the inlay antenna design. Thus, lead frames according to the present disclosure maintain production speeds of a converting machine while allowing for improved versatility in the high-performance RFID devices capable of being manufactured by a single converting machine.

Figure 4:
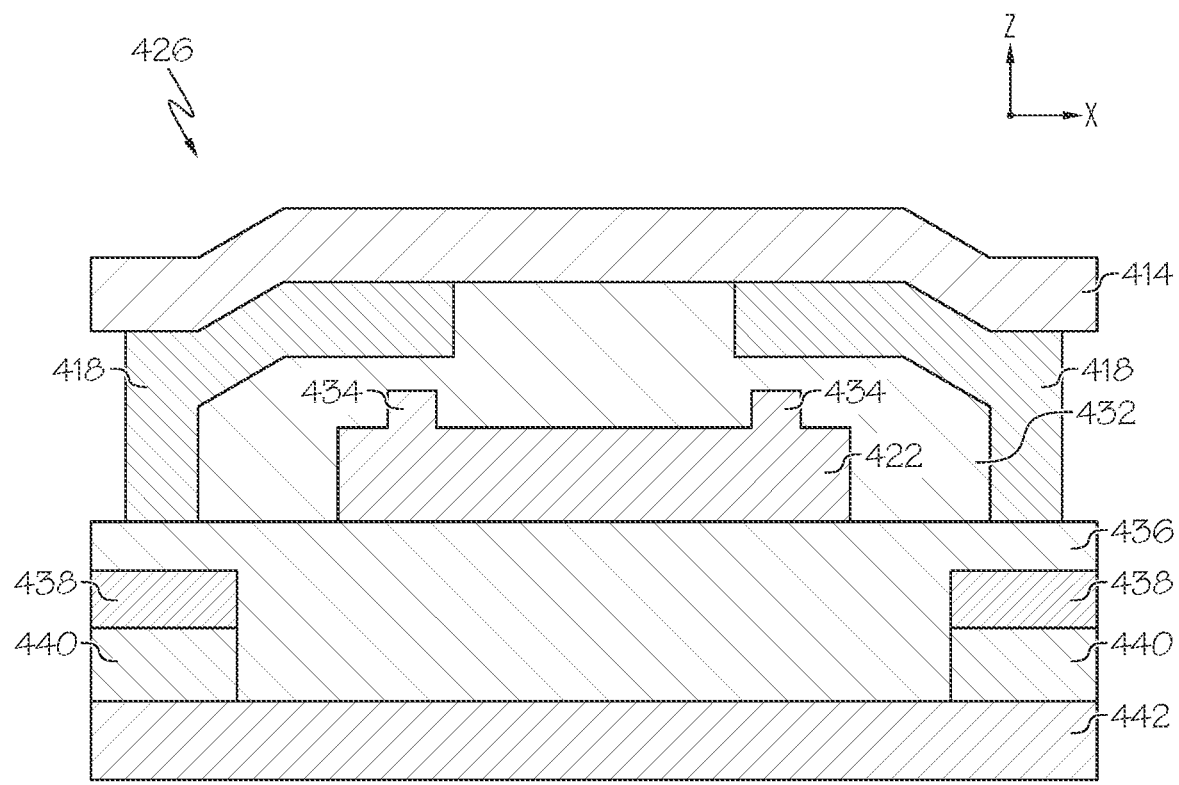
FIG. 4 is a cross-sectional view of an RFID device according to some embodiments.

In some embodiments, an RFID device may include multiple components in various arrangements. An exemplary arrangement is shown in FIG. 4, which includes both a strap substrate 414 and an antenna substrate 442. The antenna substrate 442, like the strap substrate 414, may be formed from one or more of any of a variety of materials, such as a paper, fabric, or polymeric (e.g., polyethylene terephthalate) materials. The antenna substrate 442 and the strap substrate 414 may each be formed from non-conductive materials.

In some embodiments, strap connection pads 418 are attached (e.g., adhered) to the strap substrate 414. The strap connection pads 418 may have the form factors shown in FIGS. 2A, 2B, 3A, 5A, and 5B, or other shapes.

The strap substrate 414 or the strap connection pads 418 may be bonded to an RFID chip 422, such as through use of a layer of chip adhesive 432. The RFID chip 422 may include chip connection pads 434 that are configured to be electrically coupled to the strap connection pads 418, such as through capacitive coupling or direct electrical contact (not shown). The chip connection pads 434 may include protrusions, flat surfaces, or indentations.

The RFID chip 422, the strap connection pads 418, and/or the strap substrate 414 may be bonded to the antenna 424 and/or the antenna connection pads 438 through the use of a strap adhesive 436. The strap connection pads 418 may be configured to be electrically coupled with the antenna connection pads 438, such as through capacitive coupling or direct electrical contact (not shown). The strap connection pads 418 may include protrusions, flat surfaces, or indentations.

The antenna connection pads 438 may be attached to an antenna substrate 442 through the use of an antenna adhesive 440. In some embodiments, the antenna adhesive 440 is a pressure sensitive adhesive. The antenna connection pads 438 may include protrusions, flat surfaces, or indentations.

Figure 5A:
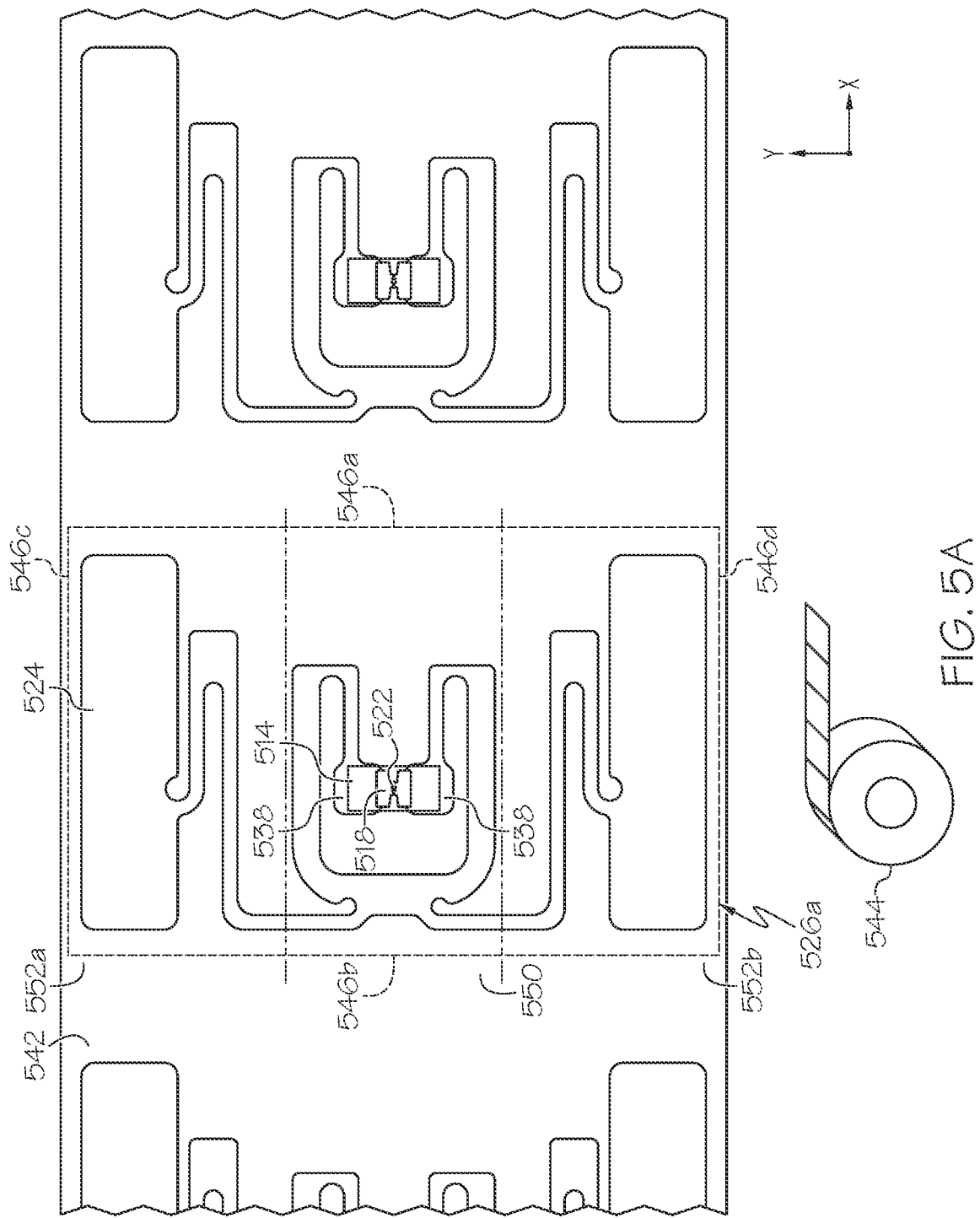
Figure 5B:
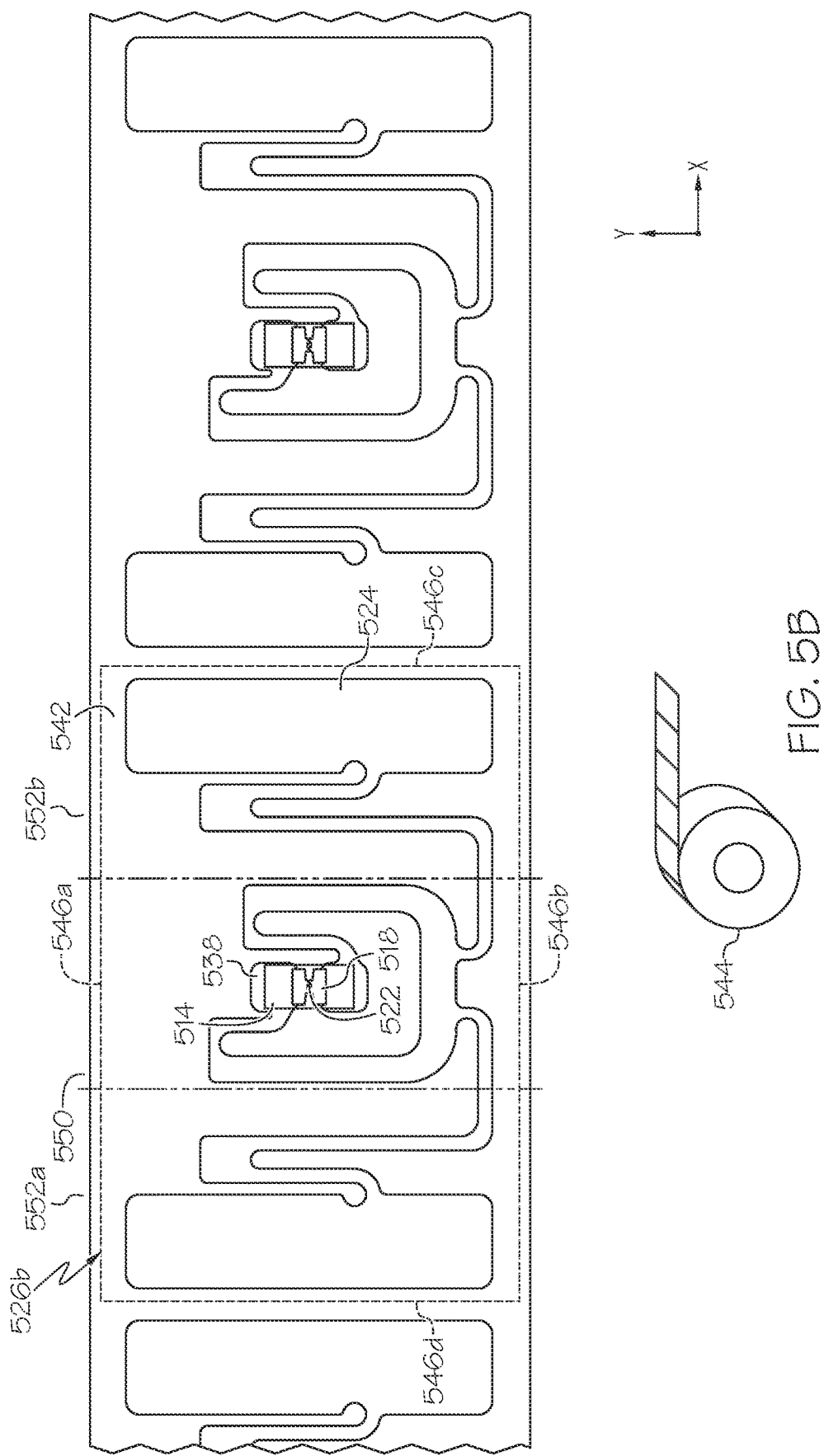

The strap substrate 414 may be the same as the strap substrate 114 or the strap substrate 514 (see FIGS. 5A and 5B). The strap connection pads 418 may be the same as the strap connection pads 118, 218, or 518. The RFID chip 422 may be the same as the RFID chip 122 or 522. The antenna 424 may be the same as the antenna 224, 324, or 524. The antenna connection pads 438 may be the same as the antenna connection pads 138, 238, or 538. The antenna substrate 442 may be the same as the antenna substrate 542.

In some embodiments of the RFID device 426, one or both of the strap substrate 414 and the antenna substrate 442 may be removed during manufacturing of the RFID device 426. This may provide benefits in terms of flexibility, weight, and reduced thickness. In addition, other known mechanisms for bonding or forming connections between materials may be used in addition to or as a replacement for an adhesive between one or more of any of the layers.

In various embodiments, an RFID device 526a, 526b, 526c, or 526d may be manufactured using one or more roll-to-roll processes. These may include the processes for:
1) attachment of the RFID chip 422 or the chip connection pads 434 to one or more of the strap connection pads 518 or the strap substrate 514 (e.g., a chip attach process); or
2) attachment of the strap components to the antenna components (e.g., a strap attach process).

The strap components may include one or more of the strap substrate 514, the strap connection pads 518, the strap adhesive 436, and the RFID chip 522, and with the antenna components including one or more of the antenna 524, the antenna connection pads 538, the antenna adhesive 440, and the antenna substrate 542. The antenna components may further include one or more of antenna pad supports 548a and 548b, a strap connection section 550, and one or more antenna sections 552a or 552b. The strap connection section 550 may be defined as including the middle section of an RFID device 526a, 526b, 526c, or 526d between two antenna sections 552a and 552b. For example, in the embodiment of FIG. 5A, the strap connection section 550 may have a length as measured in the cross-web (e.g., Y-axis) direction of 5%, 10%, 15%, 20%, 25%, or 30% of the length of the RFID device 526a as measured along the cross-web direction, with the remaining length being formed by the antenna sections 552a and 552b.

As shown in FIGS. 5A, 5B, 5C, and 5D, a series of RFID devices 526a, 526b, 526c, or 526d may be arranged on a continuous roll 544 of webbing material that may be subdivided into individual antenna substrates 542. Each RFID device 526a, 526b, 526c, or 526d may have a pair of long edges 546a and 546b and a pair of short edges 546c and 546d.

In FIG. 5A, as indicated by the illustration of a roll 544, the webbing may extend along a down web direction (e.g., along an X-axis). As the webbing is moved to or from a roll 544, the first edge of each RFID device presented is one of the long edges 546a or 546b. The overall RFID device may therefore be described as a wide edge-leading inlay. As shown, the strap substrate 514 is also wide edge leading, but in other embodiments, depending on machine configuration, antenna design, and other factors, the strap substrate 514 could be rotated to become narrow edge leading in FIG. 5A.

As shown in FIG. 5B, as indicated by the illustration of the roll 544, the webbing may extend along a down web direction (e.g., along an X-axis). As the webbing is moved to or from a roll 544, the first edge presented is one of the short edges 546c or 546d. The overall RFID device may therefore be described as a narrow edge-leading inlay. As shown, the strap substrate 514 is wide edge leading, but in other embodiments, depending on machine configuration, antenna design, and other factors, the strap substrate 514 could be rotated to become narrow edge leading in FIG. 58.

When comparing the RFID devices 526a and 526b, the antenna sections 552a and 552b may be substantially or exactly the same. Substantially the same may mean that if the antenna sections from the two RFID devices 526a and 526b were overlaid on each other, the areas of antenna parts that did not overlap would be less than 20%, 15%, 10%, 9%, 8%, 7%, 6%, 5%, 4%, 3%, 2%, or 1% of the area of the antenna parts that did overlap.

When comparing the RFID devices 526a and 526b, the strap connection sections 550, may not be substantially similar based on a percentage determined by comparing non-overlapping part areas versus overlapping part areas. In other words, the strap connection sections 550 may have more than 20%, 15%, 10%, 9%, 8%, 7%, 6%, 5%, 4%, 3%, 2%, or 1% difference.

Differences between the strap connection section 550 of FIGS. 5A and 58 may also be determined by the shapes and orientation of the antenna connection pads 538 and the antenna pad supports 548a and 548b. For example, the antenna connection supports 548a and 548b of FIG. 5A may be symmetric. In contrast, the antenna connection supports 548a and 548b of FIG. 5B may be asymmetric, with antenna connection support 548a being longer than antenna connection support 548b as measured along a cross-web (e.g., Y-axis) direction. Such differences between the designs of FIGS. 5A and 5B may result in changes in performance, and may require efforts for redesign, testing, and validation.

Figure 5C:
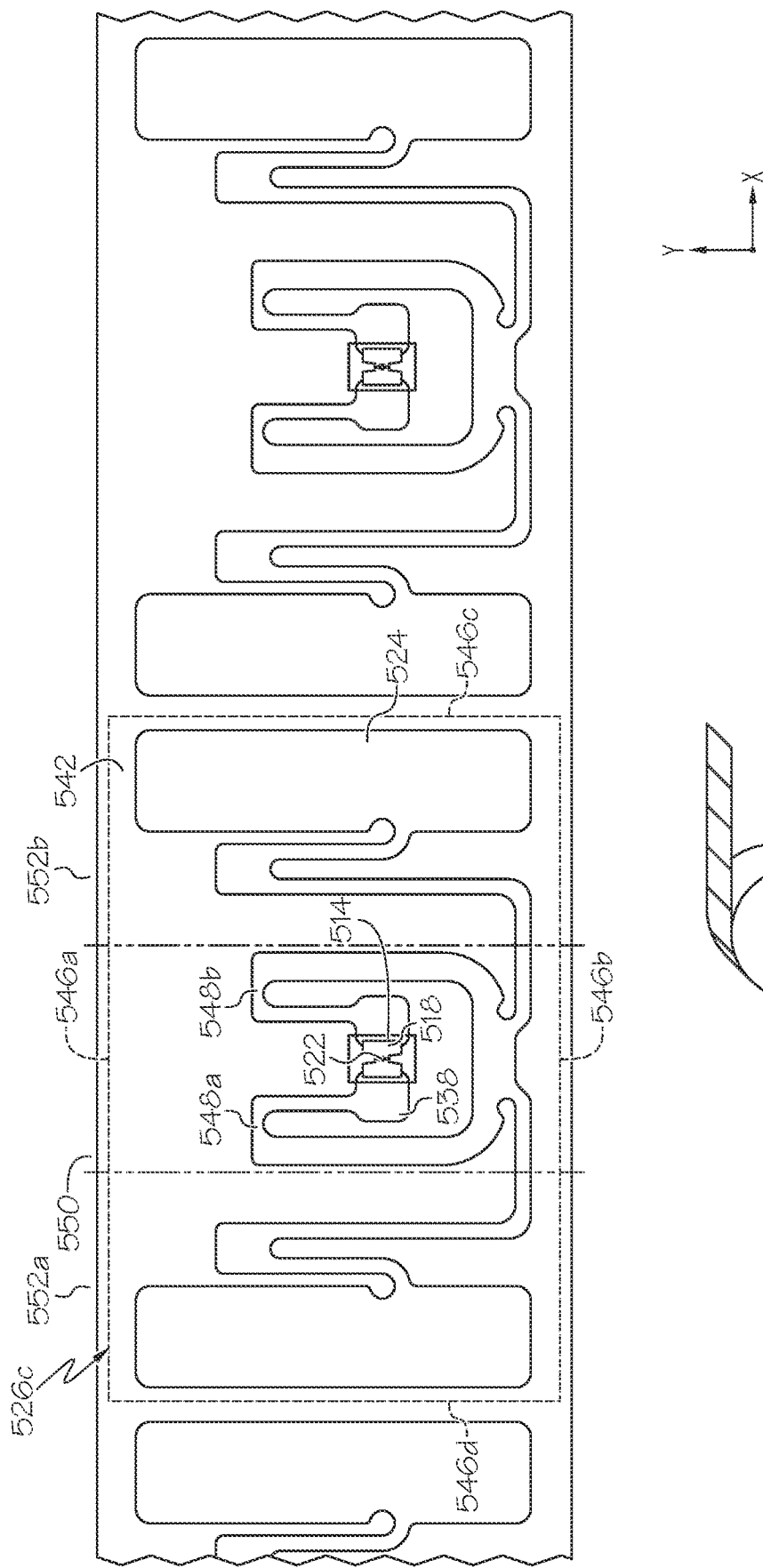

As shown in FIG. 5C, the RFID device 526a of FIG. 5A has been substantially rotated counter clockwise 90 degrees while the strap substrate 514 remains aligned with the cross-web direction (e.g., the Y-axis), which results in the RFID device 526c of FIG. 5C. By using a lead frame with strap connection pads 518 that are able to be rotated with the overall RFID device 526 even when the strap substrate 514 is not rotated, the strap connection section 550 of FIGS. 5A and 5C may be allowed to remain substantially similar. This may help reduce changes in performance and help reduce costs and resource use for redevelopment and validation. In some embodiments, the RFID device 526*a* is identical to the RFID device 526*c* other than rotation. In some embodiments, between the RFID device 526*a* and the RFID device 526*c*, the antenna sections 552*a* and 552*b* are identical while the strap connection sections 550 are substantially similar.

Similarly, in FIG. 5D, the RFID device 526*b* of FIG. 5B has been substantially rotated clockwise 90 degrees. At the same time, the RFID strap substrate 514 remains aligned with the cross-web direction (e.g., the Y-axis), resulting in the RFID device 526*c* of FIG. 5D. Again, by using a lead frame with strap connection pads 518 that are able to be rotated with the overall RFID device 526*b* even when the strap substrate 514 is not rotated, the strap connection section 550 of FIGS. 5B and 5D may be allowed to remain substantially similar. This may help reduce changes in performance and help reduce costs and resource use for redevelopment and validation. In some embodiments, the RFID device 526*b* is identical to the RFID device 526*d* other than rotation. In some embodiments, between the RFID device 526*b* and the RFID device 526*d*, the antenna sections 552*a* and 552*b* are identical while the strap connection sections 550 are substantially similar. In other words, the strap connection sections may have less than 20%, 15% 10%, 9%, 8%, 7%, 6%, 5%, 4%, 3%, 2%, or 1% difference.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID device comprising:
   a substrate;
   a lead frame secured to the substrate and comprising a pair of connection pads formed of a conductive material;
   an RFID chip electrically coupled to the lead frame; and
   an antenna electrically coupled to the lead frame, wherein a width of the lead frame is substantially equal to a height of the lead frame,
   wherein the lead frame is positioned equidistant from two short edges of the substrate, and
   the distance between the lead frame and each short edge of the substrate is substantially equal to the width of the lead frame.

2. The RFID device of claim 1, wherein
   the substrate includes two long edges extending in a direction parallel to a width of the substrate and two short edges extending in a direction parallel to a height of the substrate, and
   the connection pads are oriented along a direction parallel to the height of the substrate.

3. The RFID device of claim 2, wherein
   the lead frame is positioned equidistant from the two short edges of the substrate, and
   the distance between the lead frame and each short edge of the substrate is substantially equal to the width of the lead frame.

4. The RFID device of claim 2, wherein the height of the lead frame is within 10% of the width of the lead frame.

5. The RFID device of claim 2, wherein the height of the lead frame is within 5% of the width of the lead frame.

6. The RFID device of claim 1, wherein
   the substrate includes two long edges and the two short edges, wherein the two long edges extend in a direction parallel to a width of the substrate and the two short edges extend in a direction parallel to a height of the substrate, and
   the connection pads are oriented along a direction parallel to the width of the substrate.

7. The RFID device of claim 1, wherein the height of the lead frame is within 10% of the width of the lead frame.

8. The RFID device of claim 1, wherein the height of the lead frame is within 5% of the width of the lead frame.

9. An RFID strap comprising:
   a substrate;
   a lead frame secured to the substrate, the lead frame comprising a pair of connection pads formed of a conductive material and configured to be electrically coupled to an antenna; and
   an RFID chip electrically coupled to the lead frame, wherein a width of the lead frame is substantially equal to a height of the lead frame,
   wherein the lead frame is positioned equidistant from two short edges of the substrate, and
   the distance between the lead frame and each short edge of the substrate is substantially equal to the width of the lead frame.

10. The RFID strap of claim 9, wherein
    the substrate includes two long edges extending in a direction parallel to a width of the substrate and two short edges extending in a direction parallel to a height of the substrate, and
    the connection pads are oriented along a direction parallel to the height of the substrate.

11. The RFID strap of claim 10, wherein
    the lead frame is positioned equidistant from the two short edges of the substrate, and
    the distance between the lead frame and each short edge of the substrate is substantially equal to the width of the lead frame.

12. The RFID strap of claim 10, wherein the height of the lead frame is within 10% of the width of the lead frame.

13. The RFID strap of claim 10, wherein the height of the lead frame is within 5% of the width of the lead frame.

14. The RFID strap of claim 9 wherein
    the substrate includes two long edges and the two short edges, wherein the two long edges extend in a direction parallel to a width of the substrate and the two short edges extend in a direction parallel to a height of the substrate, and
    pair of connection pads are oriented along a direction parallel to the width of the substrate.

15. The RFID strap of claim 9, wherein the height of the lead frame is within 10% of the width of the lead frame.

16. The RFID strap of claim 9, wherein the height of the lead frame is within 5% of the width of the lead frame.

17. A method of manufacturing an RFID device, comprising:
    providing a substrate;
    securing a lead frame comprising a pair of connection pads formed of a conductive material to the substrate;
    electrically coupling an RFID chip to the lead frame; and electrically coupling an antenna to the lead frame, wherein a width of the lead frame is substantially equal to a height of the lead frame, and wherein the lead frame is positioned equidistant from two short edges of the substrate, and the distance between the lead frame and each short edge of the substrate is substantially equal to the width of the lead frame.

18. The method of claim 17, wherein the substrate includes two long edges and the two short edges, wherein the two long edges extend in a direction parallel to a width of the substrate and the two short edges extend in a direction parallel to a height of the substrate, and said securing the lead frame to the substrate includes orienting the pair of connection pads along a direction parallel to the height of the substrate.

19. The method of claim 17, wherein the substrate includes two long edges and the two short edges, wherein the two long edges extend in a direction parallel to a width of the substrate and the two short edges extend in a direction parallel to a height of the substrate, and said securing the lead frame to the substrate includes orienting the pair of connection pads along a direction parallel to the width of the substrate.

* * * * *